US011467650B2

(12) United States Patent
Branover

(10) Patent No.: US 11,467,650 B2
(45) Date of Patent: Oct. 11, 2022

(54) SELECTING A LOW POWER STATE IN AN ELECTRONIC DEVICE

(71) Applicant: Advanced Micro Devices, Inc., Santa Clara, CA (US)

(72) Inventor: Alexander J. Branover, Chestnut Hill, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 607 days.

(21) Appl. No.: 15/819,288

(22) Filed: Nov. 21, 2017

(65) Prior Publication Data

US 2019/0155368 A1 May 23, 2019

(51) Int. Cl.
| | |
|---|---|
| *G06F 1/3287* | (2019.01) |
| *G06F 1/3296* | (2019.01) |
| *G06F 1/3212* | (2019.01) |
| *G06F 1/3206* | (2019.01) |
| *G06F 1/3231* | (2019.01) |
| *G06F 9/4401* | (2018.01) |
| *G06F 1/3203* | (2019.01) |
| *G06F 1/32* | (2019.01) |

(52) U.S. Cl.
CPC .......... *G06F 1/3287* (2013.01); *G06F 1/3212* (2013.01); *G06F 1/3296* (2013.01); *G06F 1/32* (2013.01); *G06F 1/3203* (2013.01); *G06F 1/3206* (2013.01); *G06F 1/3231* (2013.01); *G06F 9/4418* (2013.01)

(58) Field of Classification Search
CPC .... G06F 1/3206; G06F 1/3203; G06F 1/3212; G06F 1/3231; G06F 9/4418; G06F 1/32; G06F 1/3287; G06F 1/3296

USPC ................................................ 713/320, 323
See application file for complete search history.

(56) References Cited

U.S. PATENT DOCUMENTS

| | | | | |
|---|---|---|---|---|
| 6,131,166 A | * | 10/2000 | Wong-Insley | G06F 1/3203 713/300 |
| 7,007,180 B2 | * | 2/2006 | Hashimoto | G06F 1/3228 713/320 |
| 9,098,258 B2 | * | 8/2015 | Reece | G06F 1/206 |
| 2003/0051181 A1 | * | 3/2003 | Magee | G06F 1/3203 713/320 |
| 2006/0294403 A1 | * | 12/2006 | Bennett | G06F 1/3203 713/300 |
| 2008/0162964 A1 | * | 7/2008 | Dahlen | G06F 1/3203 713/320 |

(Continued)

*Primary Examiner* — Ji H Bae

(74) *Attorney, Agent, or Firm* — Park, Vaughan, Fleming & Dowler LLP

(57) ABSTRACT

The described embodiments include an electronic device that has a hardware controller and one or more hardware subsystems. The one or more hardware subsystems support an active state, a first low power state, and a second low power state. The first low power state and second low power states are separate low power states, with the first low power state being associated with a more rapid resumption of the active state than the second low power state. The hardware controller is configured to cause the one or more hardware subsystems to transition from the first low power state to the second low power state upon detecting an idle event that indicates that a user interaction is not likely to occur and to transition from the second low power state to the first low power state upon detecting an active event that indicates that a user interaction is likely to occur.

22 Claims, 6 Drawing Sheets

(56) References Cited

U.S. PATENT DOCUMENTS

| | | | | |
|---|---|---|---|---|
| 2010/0223484 A1* | 9/2010 | Bold | ............... | G06F 1/206 |
| | | | | 713/324 |
| 2011/0187489 A1* | 8/2011 | Lee | ............... | G05B 23/02 |
| | | | | 340/3.1 |
| 2012/0137155 A1* | 5/2012 | Yoshida | ............... | G06F 1/3203 |
| | | | | 713/323 |
| 2014/0157026 A1* | 6/2014 | So | ............... | G06F 1/3206 |
| | | | | 713/323 |
| 2014/0344599 A1* | 11/2014 | Branover | ............... | G06F 1/3234 |
| | | | | 713/323 |
| 2015/0370307 A1* | 12/2015 | Sullivan | ............... | G06F 1/3206 |
| | | | | 713/323 |
| 2016/0147278 A1* | 5/2016 | Yoon | ............... | G06F 1/3231 |
| | | | | 713/323 |
| 2017/0010654 A1* | 1/2017 | Chen | ............... | G06F 1/3231 |
| 2017/0308148 A1* | 10/2017 | Soliman | ............... | G06F 1/263 |

* cited by examiner

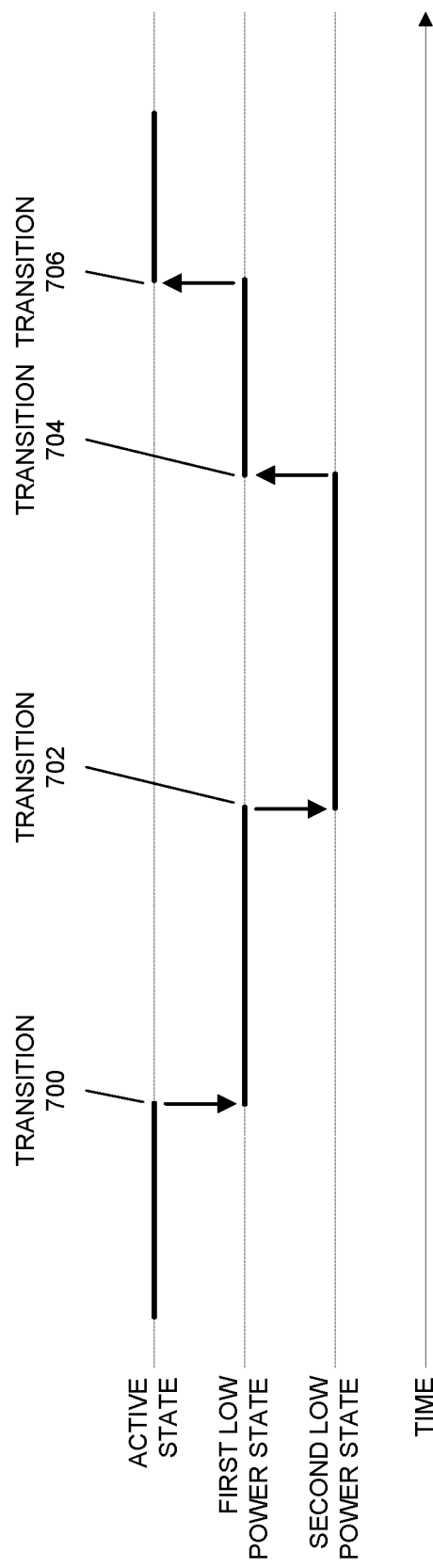

SELECTING A LOW POWER STATE IN AN ELECTRONIC DEVICE

BACKGROUND

Related Art

Some electronic devices support one or more low power states in which device subsystems (e.g., displays, processors, hard disk drives or memories, wired or wireless networking systems, etc.) have operating parameters configured so that the subsystems consume less electrical power, produce less heat, etc. when compared to higher-power power states such as an active (or full power) state. For example, some devices support the low power states defined in the Advanced Configuration and Power Interface (ACPI) standard. In such devices, configuring the operating parameters to place the subsystems in a given low power state includes operations such as reducing supply voltages to the subsystems, decreasing frequencies of controlling clocks for the subsystems, and/or disabling or powering off the subsystems. In such devices, software entities are responsible for configuring the operating parameters for the subsystems to place the subsystems in the low power states. For example, an operating system, a device driver, or a software application may cause the subsystems to transition from the active state to a given low power state.

Using the above-described low power states, devices are able to operate more efficiently in terms of power consumption, heat generation, etc. The use of the low power states, however, can introduce inefficiencies in the operation of the devices. For example, when transitioning to some low power states, devices must preserve subsystem operating state so that subsystem operating state is not lost when volatile subsystem memory elements (registers, memories, flops/latches, etc.) are subsequently disabled or powered off. For operating state preservation, subsystem operating state is copied from the volatile subsystem memory elements to a non-volatile memory such as a hard disk drive or to a volatile memory that is to remain enabled. When subsequently transitioning back out of the low power state, the preserved subsystem state must be acquired and copied back to the volatile subsystem memory elements to recover the operating state. As another example, when transitioning to some low power states, devices disable or power down subsystem functional blocks, circuits, etc., which then must then be reinitialized or restarted when subsequently transitioning back out of the low power state. Each of these operations takes time, and the total transition time for a given low power state can be significant. Until the transition from a low power state to the active state is completed, a device may not function or may have noticeably slower operation, which can be frustrating for a user. Significant effort has been applied to reducing the latency of transitions from the low power states, but users can still be frustrated during the transition time.

BRIEF DESCRIPTION OF THE FIGURES

FIG. 7 presents a chart illustrating the transitions between power states in accordance with some embodiments.

Throughout the figures and the description, like reference numerals refer to the same figure elements.

DETAILED DESCRIPTION

Figure 1:
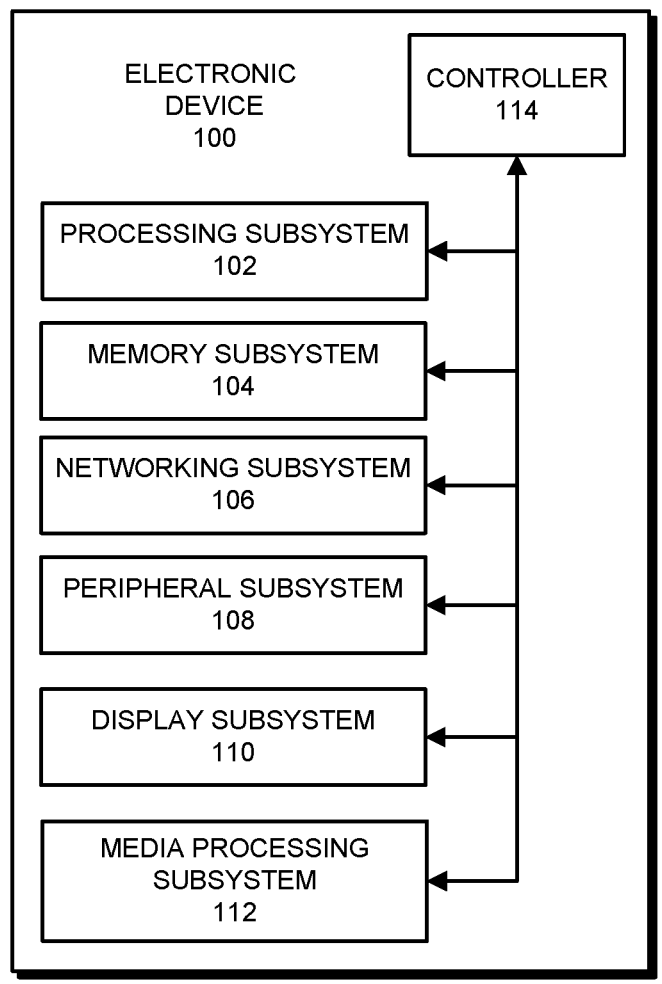
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of a few of these terms. Note that the terms may have significant additional aspects that are not recited herein for clarity and brevity and thus the description is not intended to limit the terms.

Transition: the term transition as used herein means to set/reset, adjust, update, or otherwise change hardware (e.g., circuit elements, functional blocks, devices, etc.) of a given subsystem in an electronic device from operating in a first power state to operating in a second power state. For example, when transitioning to the second power state from the first power state, a supply voltage may be reduced from a first voltage, e.g., 1.2 V, to a second voltage, e.g., 0.7 V, by configuring corresponding voltage regulators, power supplies, etc. As another example, when transitioning to the second power state from the first power state, a clock frequency may be reduced from a first frequency, e.g., 1.8 GHz, to a second frequency, e.g., 900 MHz, by throttling or dividing the clock, reconfiguring a clock controlling element, selecting an available lower frequency clock, etc.

Interaction: the term interaction (or "user interaction") as used herein means an activity or activities performed by a user using one or more user interface devices for an electronic device. For example, assuming that the electronic device has a keyboard, user interactions include key presses, touch pad touches or gestures, and/or manipulation of other keyboard features such as wheels, fingerprint detectors, on-off switches, etc. As another example, assuming that the electronic device has a microphone, user interactions include spoken commands, sounds produced by the user (as in sound-based proximity detection), etc.

Power States

The described embodiments include an electronic device that has one or more hardware subsystems such as processing subsystems, memory subsystems, display subsystems, etc. The one or more subsystems provide support for at least three power states: an active state, a first low power state, and a second low power state. The active state, the first low power state, and the second low power state are separately described below.

The active state is a power state in which the one or more subsystems of the device are in a typical or normal operating mode. In the active state, the one or more subsystems are able to perform typical operations without transitioning to a higher-power power state. For example, in the active state, a central processing unit (CPU) may perform typical operations such as executing program code, processing inputs (interrupts, faults, etc.), communicating with other subsystems, etc. As another example, in the active state, a networking subsystem may perform typical operations such as transmitting and receiving network traffic (e.g., packets, signals, etc.), processing inputs (interrupts, faults, etc.), communicating with other subsystems, etc. In the active state, subsystem operating parameters are set, adjusted, or configured for the one or more subsystems so that the one or more subsystems are able to perform the typical operations. For example, the operating parameters can include one or more of a supply voltage, a frequency of a controlling clock, a bandwidth allowance, a length of job queues, a throttling of an output rate, etc. In the case of supply voltage, this means that, in the active state, the supply voltage for each of the one or more subsystems is set above a specified threshold voltage that enables the performance of the typical operations. In the active state, the device may outwardly appear to be powered on and operating normally, with the one or more subsystems responding typically to user interactions, etc.

The first low power state is a power state in which one or more subsystems of the device are in a low power mode. In the first low power state, some or all of the one or more subsystems are unable to perform at least some typical operations (or are unable to perform the typical operations at ordinary speeds) and must transition to the active state before the at least some of the typical operations can be performed. For example, in the first low power state, the display subsystem may be configured so that a display of the device is disabled, the memory subsystem may be configured so that a hard disk drive or solid-state drive is powered down, stopped, or in a lower power mode, the processing subsystem may be configured so that a CPU core is in an operating mode in which some or all processing functions are disabled or performed relatively slowly, etc. For the first low power state, subsystem operating parameters are set, adjusted, or configured to have corresponding values. For example, the operating parameters can include one or more of a supply voltage, a frequency of a controlling clock, a bandwidth allowance, a length of job queues, a throttling of an output rate, etc. In the case of supply voltage, this means that, in the first low power state, the supply voltage for each of the one or more subsystems (or for portions thereof) is set below a first specified threshold voltage such as 0.7 V or another voltage. In the first low power state, the device may outwardly appear to be in a low power state, with a screen powered off, one or more features operating slowly or not operating, etc.

The second low power state is a power state in which one or more subsystems of the device are in a low power mode. In the second low power state, some or all of the one or more subsystems are unable to perform at least some typical operations (or are unable to perform the typical operations at ordinary speeds) and must transition to the active state before the at least some of the typical operations can be performed. For example, in the second low power state, the display subsystem may be disabled or powered down, the memory subsystem may be configured so that a hard disk drive or solid-state drive is stopped or powered down and a volatile main memory is powered down, the processing subsystem may be configured so that a CPU core is disabled or powered down, etc. For the second low power state, subsystem operating parameters are set, adjusted, or configured to have corresponding values. For example, the operating parameters can include one or more of a supply voltage, a frequency of a controlling clock, a bandwidth allowance, a length of job queues, a throttling of an output rate, etc. In the case of supply voltage, this means that, in the second low power state, the supply voltage for each of the one or more subsystems (or for portions thereof) is set below a first specified threshold voltage such as 0.3 V or another voltage. In the second low power state, the device may outwardly appear to be in a low power state, with a screen powered off, one or more features operating slowly or not operating, etc.

The first low power state and second low power state differ in the configuration of the one or more subsystems while in each respective low power state. Generally, the first low power state is a relatively "shallower" or "higher-powered" low power state (i.e., of the first low power state and the second low power state) from which the one or more subsystems are more readily/quickly transitioned to the active state, and the second low power state is a relatively "deeper" or "lower-powered" power state (i.e., of the first low power state and the second low power state) from which the one or more subsystems are less readily/quickly transitioned to the active state. For example, in some embodiments, in the first low power state, a given subsystem may retain operating state, such as by keeping registers, volatile memory elements, etc. at a voltage and clock frequency sufficiently high to enable the retention of the operating state. In these embodiments, in the second low power state, the operating state is not retained by the given subsystem. This means that the operating state is copied to a non-volatile memory when the given subsystem enters the second low power state and then copied back from the non-volatile memory when the given subsystem transitions from the second low power state to the active state (or the first low power state). The copying operation slows the transition from the second low power state to the active state. As another example, in some embodiments, in the first low power state, one or more functional blocks or circuits from among two or more functional blocks or circuits in a given subsystem may remain at least partially enabled or powered up, so that the functional blocks or circuits need not be re-enabled or powered up to transition to the active state— and the same functional blocks or circuits may be disabled or powered down in the second low power state. From the first low power state, therefore, the transition to the active state is typically faster, and can be significantly faster (e.g., hundreds of times), than the transition to the active state from the second low power state. For example, in some embodiments, the transition from the first low power state to the active state for the one or more subsystems is approximately 1 millisecond and the transition from the second low power state to the active state is approximately 500 milliseconds for the one or more subsystems.

In some embodiments, although a subsystem is in the first low power state or the second low power state, the subsystem may be able to perform at least some of the typical operations of the subsystem. For example, in the first low power state and/or the second low power state, a given subsystem may be mostly disabled, powered down, or operating slowly (e.g., with low clock frequency), with the exception of a small functional block that is responsible receiving specified inputs (e.g., user inputs, interrupts or exceptions, certain network packets, read/write requests, etc.) and waking one or more other functional blocks in the subsystem for processing or otherwise handling the inputs (which may include transitioning the subsystem to the active state). In some embodiments, in the first low power state, one or more subsystems are at least partially enabled to perform specified tasks, such as audio playback, voice commands, or network traffic handling.

Although the names first low power state and second low power state are used in describing low power states herein, there is no requirement that the power states in all embodiments be labeled as first low power state and second low power state. There is further no requirement regarding the particular configurations (in terms of voltage, clock frequency, state retention, enabled/disabled, etc.) of the one or more subsystems in each of the low power states. Generally, the described embodiments are operable with any first and second low power states: (1) for which transitions between the first and second low power states are possible; and (2) for which the first low power state is a low power state from which the one or more subsystems are more readily/quickly transitioned to the active state and the second low power state is a power state from which the one or more subsystems are less readily/quickly transitioned to the active state. In addition, the active state, first low power state, and second low power state may not be the only power states supported by the one or more subsystems and/or the electronic device. For example, the described embodiments may support a separate "off" power state in which all electrical power is disabled to the one or more subsystems, i.e., the device is turned off. The one or more subsystems in the described embodiments, however, support at least the active state, the first low power state, and the second low power state.

Overview

The described embodiments include an electronic device that has one or more hardware subsystems such as processing subsystems, memory subsystems, display subsystems, etc. The device also includes a hardware controller such as a power controller device or an application specific integrated circuit. The controller is configured to cause the one or more subsystems to transition between a number of different power states, including the above-described active state, the first low power state, and the second low power state. The controller causes the one or more subsystems to transition between the power states based at least in part on assumptions or predictions of upcoming user interactions.

In some embodiments, the transition in power states is a transition from the second low power state to the first low power state that is made in order to make the one or more subsystems more ready to transition to the active state, while also maintaining the one or more subsystems in a low power state to avoid unnecessary power consumption, heat generation, noise, etc. In other words, the described embodiments transition from a second relatively "deeper" or "lower-powered" low power state to a first relatively "shallower" or "higher-powered" low power state from which the one or more subsystems are more readily/quickly transitioned to the active state, anticipating that a transition to the active state will be made in relatively short order. In these embodiments, while in the second low power state, the controller monitors for "active events," which serve as indications that user interaction—e.g., a user input via a keyboard, mouse, voice command, etc.—is likely to occur within a given time. For example, the controller may monitor for a specified time of day or night occurring and/or a detection of a user proximal to the electronic device. As another example, the controller may generate a prediction, based on one or more previous user interactions, that a user interaction is likely to occur within a specified time, and can detect an active event based on the prediction. Upon detecting the active event, the controller causes the one or more subsystems to transition from the second low power state to the first low power state. By performing the transition from the second low power state to the first low power state as described, the controller places the one or more subsystems in a power state (i.e., the first low power state) from which the one or more subsystems can subsequently transition more rapidly to the active state—although more power may be consumed, more heat generated and noise produced, etc. than if the one or more subsystems were in the second low power state.

In some embodiments, the transition in power states is a transition from the first low power state to the second low power state that is made in order to place the one or more subsystems the lower-power power state to better conserve power, avoid heat generation and noise, etc. In other words, the described embodiments transition from a first relatively "shallower" or "higher-powered" low power state to a second relatively "deeper" or "lower-powered" low power state from which the one or more subsystems are less readily/quickly transitioned to the active state, anticipating that no transition to the active state will be necessary in relatively short order. In these embodiments, while in the first low power state, the controller monitors for "idle events," which serve as indications that user interaction is not likely to occur within a given time. For example, the controller can monitor for a low power state inactivity timer expiring, the low power state inactivity timer having been started upon detecting a most recent user interaction, a user presence timer expiring, the user presence time having been started when a user could no longer be detected proximal to the electronic device, and a specified time of day or night occurring. Upon detecting the idle event, the controller causes the one or more subsystems to transition from the first low power state to the second low power state. By performing the transition from the first low power state to the second low power state as described, the controller places the one or more subsystems in a power state (i.e., the second low power state) in which the one or more subsystems consume less power, generate less heat, etc.—although transitions to the active state by the one or more subsystems require a longer time from the second low power state than the first low power state.

In some embodiments, the controller also causes transitions from the first low power state to the second low power state based on "system events." In these embodiments, the controller monitors for system events such as the occurrence of a particular battery discharge level, the occurrence of a specified trend in a battery discharge rate, the occurrence of a threshold temperature for one or more portions of the electronic device, and/or the receipt of a request for transitioning from an external source. Upon detecting a system event, the controller causes the one or more subsystems to transition from the first low power state to the second low power state. As described above, in the second low power state, the system better conserves power, etc.

In some embodiments, in addition to the transitions between the first low power state and the second low power state, the controller causes various other power-state transitions based on user interactions, system states, etc. For example, in some embodiments, the controller causes the one or more subsystems to transition from either of the second low power state or the first low power state to the active state upon detecting a user interaction. As another example, the controller causes the one or more subsystems to remain in the first low power state and not transition to the second low power state when operating in a given operating mode, such as when running audio playback in the first low power state or when in a wake-on-voice state in which one or more subsystems monitor for a user's voice command. As yet another example, the controller causes the one or more subsystems to transition from the active state to the first low power state upon an expiration of an inactivity timer that was started upon detecting a last user interaction in the active state.

By causing the one or more subsystems to transition between the active state, the first low power state, and the second low power state based on the likelihood (or unlikelihood) of the occurrence of user interactions, the described embodiments are able to maintain the device in a power state that is best suited for consuming less power, generating less heat, etc. while also remaining responsive to a user of the device. In other words, when user interaction is likely to occur, the described embodiments transition the one or more subsystems from the second low power state to the first low power state to enable a more rapid resumption of the active state. In contrast, when user interaction is not likely to occur, the described embodiments transition the one or more subsystems from the first low power state to the second low power state, thereby placing the one or more subsystems in a lower-power power state in which less power is consumed, heat is generated, etc. In this way, compared to existing devices, the described embodiments better balance the twin goals of conserving power and being as responsive as possible for users.

In addition, as described herein, the controller is a hardware functional block that performs operations for transitioning the one or more subsystems between the power states. In some embodiments, there is very little or no involvement of software entities (e.g., operating systems, firmware, or application software) in the actual determination of when to make transitions between power states. In this way, the electronic device in these embodiments, makes decisions about transitions between power states at a "hardware level," i.e., at a level below a "software level," meaning that these embodiments can perform transitions—and conserve power while remaining responsive—without regard to the particular software executing on the electronic device. This is an improvement over existing systems, in which software is responsible for controlling power states. Note, however, that the hardware controller may use information about software executing on the electronic device (e.g., software workloads, trends in the software workloads, software workload profiles, etc.), including such information acquired from software entities, when making the determination whether to make transitions between power states, but the hardware controller makes the determination as described above.

System

FIG. 1 presents a block diagram illustrating an electronic device 100 in accordance with some embodiments. As can be seen in FIG. 1, electronic device 100 includes processing subsystem 102, memory subsystem 104, networking subsystem 106, peripheral subsystem 108, display subsystem 110, media processing subsystem 112, and controller 114. Generally, processing subsystem 102, memory subsystem 104, networking subsystem 106, peripheral subsystem 108, display subsystem 110, media processing subsystem 112 ("the subsystems") are implemented in hardware, i.e., using various circuit elements and devices. For example, some or all of the subsystems can be entirely fabricated on one or more semiconductor chips, can be fashioned from semiconductor chips in combination with discrete circuit elements, etc.

Processing subsystem 102 is a functional block that is configured to perform computational operations (e.g., instruction execution, data processing, etc.), control operations, event handling operations, and/or other operations. For example, processing subsystem 102 may include one or more central processing units (CPUs) or CPU cores, graphics processing units (GPUs) or GPU cores, application-specific integrated circuits (ASICs), microcontrollers, and/or programmable-logic devices.

Memory subsystem 104 is a functional block that is configured to store data and/or instructions for access by the other subsystems in electronic device 100 and perform operations for providing the other subsystems to access to the data and/or instructions. In some embodiments, memory subsystem 104 includes volatile memory circuits such as dynamic random access memory (DRAM), static random access memory (SRAM), and/or other types of memory that are used for storing the instructions and data, as well as mechanisms for controlling the memory circuits. In some embodiments, memory subsystem 104 includes a memory hierarchy with one or more caches and a main memory (processing subsystem 102 may also include one or more caches).

In some embodiments, memory subsystem 104 is coupled to one or more non-volatile high-capacity mass-storage devices (not shown). For example, memory subsystem 104 can be coupled to a magnetic or optical disk drive, a solid-state drive, or another type of mass-storage device. In these embodiments, memory subsystem 104 can be used by electronic device 100 as fast-access storage for more frequently/recently used data, while the mass-storage device is used to store less frequently/recently used data.

Networking subsystem 106 is a functional block that is configured to couple to and communicate on one or more wired and/or wireless networks. For example, networking subsystem 106 can include one or more of a Bluetooth networking system, a cellular networking system (e.g., a 4G network such as LTE), a universal serial bus (USB) networking system, a networking system based on the standards described in Institute for Electrical and Electronics Engineers (IEEE) 802.11, 802.15, etc. (e.g., a Wi-Fi networking system), an Ethernet networking system, and/or another networking system. Networking subsystem 106 includes processors, controllers, radios/antennas, sockets/plugs, and/or other devices used for coupling to, communicating on, and handling data and events for each supported networking system. In the following description, the mechanisms used for coupling to, communicating on, and handling data and events on the network for each network system are referred to collectively as the "interface" or "network interface" for the network system.

Peripheral subsystem 108 is a functional block that performs operations relating to interfacing electronic device 100 with peripheral devices such as keyboards, mice, scanners, microphones, etc. Peripheral subsystem 108 includes connectors (plugs, sockets, etc.) and controllers for connecting to, receiving information (e.g., interrupts/requests, data, messages, etc.) from, and sending information to peripherals that are connected to electronic device 100.

Display subsystem 110 is a functional block that performs operations relating to presenting information on a display (e.g., a display screen). Display subsystem 110 includes connectors (e.g., sockets, plugs, etc.) and controllers for receiving information to be shown on the display from other subsystems in electronic device 100 and providing the information to the display to be presented thereon. In some embodiments, display subsystem 110 receives information from a touch screen display and handles the information, such as by forwarding the received information to processing subsystem 102 or other subsystems.

Media processing subsystem 112 is a functional block that performs operations relating to processing media for display on the display of electronic device 100, output via one or more speakers coupled to electronic device 100, and/or for another form of presentation (e.g., haptic, etc.). For example, media processing subsystem 112 may decode audio and/or video, render information for presentation, and/or perform other media processing functions.

In the described embodiments, some or all of processing subsystem 102, memory subsystem 104, networking subsystem 106, peripheral subsystem 108, display subsystem 110, and media processing subsystem 112 ("the subsystems") support the active state, the first low power state, and the second low power state. In other words, at least some of the subsystems include mechanisms, or are associated with mechanisms, for configuring the corresponding subsystem in the active state, the first low power state, and the second low power state. For example, the at least some of the subsystems may include or be associated with voltage regulators, circuit configuration elements, power switches, local controller functional blocks, multiple clocks, clock gates, configurable phase-locked loops, selectively disabled/enabled functional blocks such as memories, registers, processing circuits, etc., bias-able circuits, configurable work queues, throttle-able processing circuits, and/or other mechanisms that can be used to configure the corresponding system in the active state, the first low power state, and the second low power state.

Controller 114 is a functional block that performs operations for controlling the power states in which the subsystems in electronic device 100 operate (and possibly performs other operations). For example, controller 114 may be a power controller, a system management controller, a dedicated power state controller, etc. that is implemented in hardware, i.e., using various circuit elements and devices. During operation, controller 114 causes the one or more subsystems to transition between power states based on assumptions or predictions of upcoming user interactions or based on system events as described herein. By "causing" subsystems to transition between power states as described herein, controller 114 performs operations directed at configuring the subsystems to operate in the target/destination power state. For example, assuming that the transition in the power states involves an increase in supply voltage for a given subsystem, controller 114 can reconfigure a voltage regulator that provides the supply voltage for the given subsystem, switch the supply voltage for the given subsystem to another source, or otherwise reconfigure the supply voltage for the given subsystem. As another example, assuming that transition in the power states involves disabling a subsystem or some part thereof—e.g., disabling a backlit display in display subsystem 110, disabling some or all wired or wireless network interfaces in networking subsystem 106, etc.—controller 114 can perform one or more operations to disable the subsystem or part thereof, such as disconnecting electrical power to the subsystem or part thereof.

In some embodiments, communication paths (that include one or more buses, wires, guides, and/or connections) are coupled between the functional blocks in electronic device 100 (e.g., processing subsystem 102, memory subsystem 104, etc.), as shown by arrow-headed lines between the elements. The communication paths are used to transmit commands, data, and/or other information between the elements.

Although specific subsystems are shown in electronic device 100, in some embodiments, different subsystems and/or components may be included in electronic device 100. For example, electronic device 100 may include one or more additional processing subsystems 102, memory subsystems 104, etc. Additionally, one or more of the subsystems may not be included in electronic device 100, or some or all of the one or more of the subsystem's functions may be incorporated into the other subsystems. In addition, although electronic device 100 is simplified for illustrative purposes, in some embodiments, electronic device 100 includes additional or different subsystems, functional blocks, elements, and/or communication paths. For example, electronic device 100 may include power subsystems, I/O subsystems, etc. Generally, electronic device 100 includes sufficient subsystems to perform the operations herein described.

Electronic device 100 can be, or can be included in, any device that performs computational operations. For example, electronic device 100 can be, or can be included in, a desktop computer, a laptop computer, a wearable computing device, a tablet computer, a piece of virtual or augmented reality equipment, a smart phone, an artificial intelligence (AI) device, a server, a network appliance, a toy, a piece of audio-visual equipment, a home appliance, a vehicle, etc., and/or combinations thereof.

Transitioning from the Active State to the First Low Power State

Figure 2:
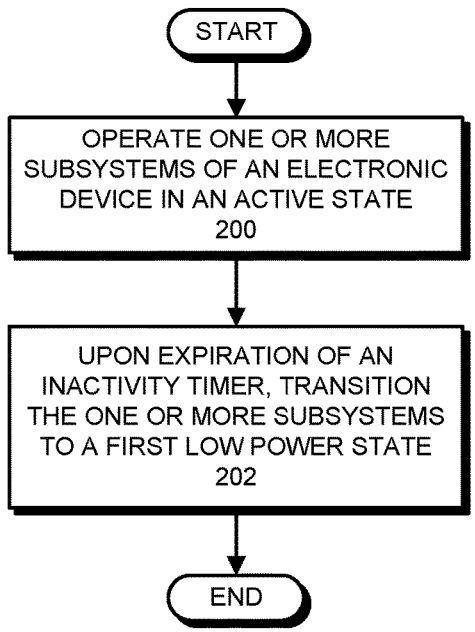
FIG. 2 presents a flowchart illustrating a process for transitioning one or more subsystems of an electronic device from the active state to the first low power state in accordance with some embodiments.

The described embodiments perform operations for transitioning one or more of the subsystems in electronic device 100 (e.g., processing subsystem 102, networking subsystem 106, etc.) from the active state to the first low power state. FIG. 2 presents a flowchart illustrating a process for transitioning the one or more subsystems from the active state to the first low power state in accordance with some embodiments. Note that the operations shown in FIG. 2 are presented as a general example of functions performed by some embodiments. The operations performed by other embodiments include different operations and/or operations that are performed in a different order. Additionally, although certain mechanisms are used in describing the process (e.g., controller 114, etc.), in some embodiments, other mechanisms can perform the operations.

Figure 3:
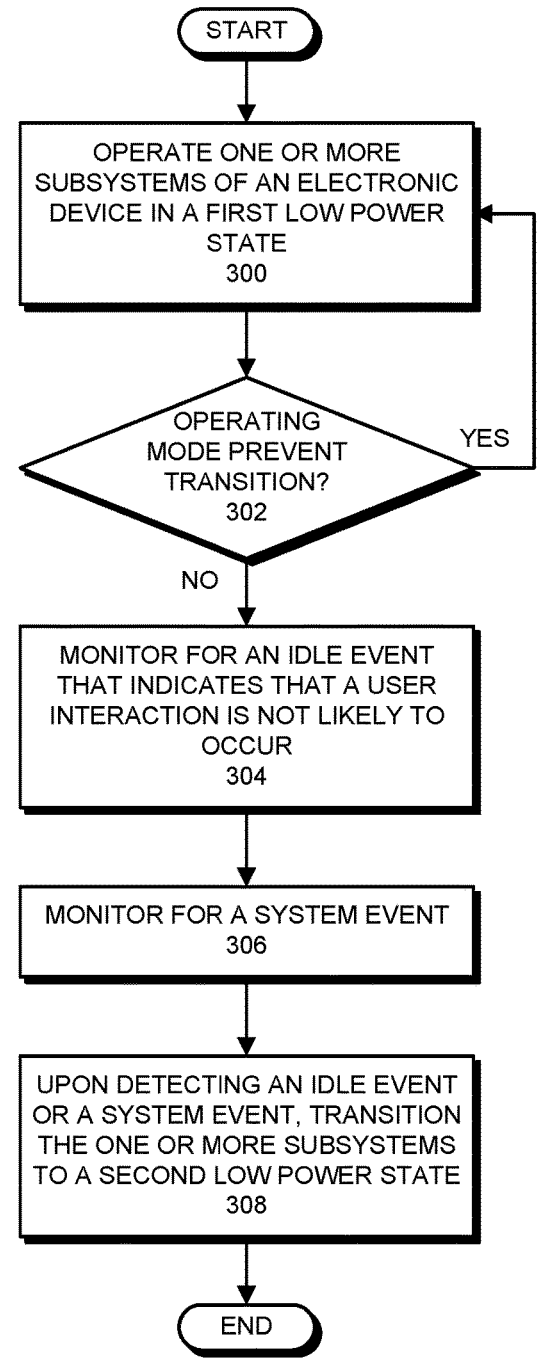
FIG. 3 presents a flowchart illustrating a process for transitioning one or more subsystems of an electronic device from the first low power state to the second low power state in accordance with some embodiments.

As used for the example in FIG. 2 and other locations in this description, the "one or more" subsystems that are transitioned from a given power state to another power state (e.g., the active state to the first low power state as shown in FIG. 2, the first low power state to the second low power state shown in FIG. 3, etc.) can be as few as one of the subsystems or as many as all of the subsystems. For example, in the first low power state, the display subsystem may be configured so that a display of the device is disabled, the memory subsystem may be configured so that a hard disk drive is stopped, and the processing subsystem may be configured so that a CPU core is in an operating mode in which some or all processing functions performed relatively slowly (e.g., with lower frequency clocks and/or lower voltages). For this example, at least the display subsystem, the memory subsystem, and the processing subsystem are transitioned from the active state to the first low power state, so that the "one or more" subsystems include at least these three subsystems.

The process shown in FIG. 2 starts when one or more subsystems of electronic device 100 operate in an active state (step 200). As described above, in the active state, the one or more subsystems (and usually all of the subsystems) are in a typical or normal operating mode, so that electronic device 100 appears outwardly to be operating normally. In other words, a display of the device is enabled and may be presenting information, the memory subsystem is configured so that a hard disk drive or solid-state drive is energized (and possibly spinning) and available for accesses and a main memory is enabled, the processing subsystem is configured so that a CPU core is in an operating mode in which some or all processing functions are enabled and performed at typical speeds. The one or more subsystems may have been configured in the active state as part of a start-up of electronic device 100, may have earlier been transitioned to the active state from a low power state (e.g., the first low power state or the second low power state), etc.

Upon expiration of an inactivity timer, controller 114 causes the one or more subsystems to transition to the first low power state (step 202). For example, an inactivity timer may be started when a first specified user interaction (e.g., key press, mouse movement, software application close, touch on a touch screen, movement of electronic device 100, peripheral device plug/unplug, etc.) occurs and may run to expiration if a second user interaction does not occur. Using the example of the key press, this means that the inactivity timer (of 15 minutes or another time) is started as a user presses one of the keys on a keyboard coupled to electronic device 100, and then expires if the user does not make a subsequent key press. In this way, controller 114 can determine (i.e., assume) that a user is not using electronic device 100 and can therefore transition the one or more subsystems to the first low power state. As described above, of the first and second low power states, the first low power state is the low power state from which resumption of the active state is the most rapid. Controller 114 therefore places the one or more subsystems in a low power state, but leaves the one or more subsystems in a relatively "shallower" or "higher power" low power state so that the active state can be more easily resumed, if user interaction is detected.

As described above, when transitioning the one or more subsystems from the active state to the first low power state, controller 114 set/reset, adjust, update, or otherwise change hardware (e.g., circuit elements, functional blocks, devices, etc.) of each of the one or more subsystems in an electronic device from operating in the active state to operating in the first low power state. The elements of the one or more subsystems that are set/reset, adjusted, etc. depends on the particular configuration of the first low power state for the one or more subsystems.

Transitioning from the First Low Power State to the Second Low Power State

The described embodiments perform operations for transitioning one or more of the subsystems in electronic device 100 (e.g., processing subsystem 102, networking subsystem 106, etc.) from the first low power state to the second low power state. FIG. 3 presents a flowchart illustrating a process for transitioning the one or more subsystems from the first low power state to the second low power state in accordance with some embodiments. Note that the operations shown in FIG. 3 are presented as a general example of functions performed by some embodiments. The operations performed by other embodiments include different operations and/or operations that are performed in a different order. For example, in some embodiments, only one of steps 304-306 is performed, so that controller 114 monitors only for the idle event or the system event. Additionally, although certain mechanisms are used in describing the process (e.g., controller 114, etc.), in some embodiments, other mechanisms can perform the operations.

The process shown in FIG. 3 starts when one or more subsystems of electronic device 100 operate in a first low power state (step 300). As described above, in the first low power state, some or all of the one or more subsystems are unable to perform at least some typical operations (or are unable to perform the typical operations at ordinary speeds) and must transition to the active state before the at least some of the typical operations can be performed. For example, the display subsystem may be configured so that a display of the device is disabled, the memory subsystem may be configured so that a hard disk drive is stopped, and the processing subsystem may be configured so that a CPU core is in an operating mode in which some or all processing functions performed relatively slowly (e.g., with lower frequency clocks and/or lower voltages). The one or more subsystems may have been configured in the first low power state as part of a start-up of electronic device 100, may have earlier been transitioned to the first low power state from the active state or the second low power state, etc.

In some embodiments, in the first low power state, subsystem state is retained in some or all functional blocks in the one or more subsystems. For example, subsystem registers, memory elements and caches, volatile memories, flops and latches, and other circuit elements are supplied with sufficient voltage and clock frequency (if applicable) to enable the circuit elements to retain the state. In some embodiments, functional blocks or circuits in subsystem are at least partially enabled or powered up, so that the functional blocks or circuits need not be re-enabled or powered up to transition to the active state.

When an operating mode of electronic device 100 prevents the transition from the first low power state to the second low power state (step 302), controller 114 will continue to operate the one or more subsystems in the first low power state (step 300). For example, in some embodiments, electronic device 100 supports a media playback mode. In the media playback mode, media processing subsystem 112 and/or other subsystems are, to the extent possible, in the first low power state, but are powered up sufficiently and are otherwise configured to enable the playback of media such as audio (e.g., decoding, amplification, play though a speaker of electronic device 100). While electronic device 100 is in the media playback mode, controller 114 will not cause a transition to the second low power state. As another example, in some embodiments, electronic device 100 supports a network traffic mode. In the network traffic mode, networking subsystem 106 and/or other subsystems are, to the extent possible, in the first low power state, but are powered up sufficiently and are otherwise configured to process messages (e.g., push messages, data packets, etc.) that are received via one or more network interfaces. While electronic device 100 is in the network traffic mode, controller 114 will not cause a transition to the second low power state.

When the operating mode of electronic device 100 does not prevent a transition in power states (step 302), controller 114 monitors for an idle event that indicates that a user interaction is not likely to occur (step 304). For this operation, controller 114, using various monitoring mechanisms, keeps track of events and other indicators of possible upcoming user interactions. Based on the monitoring, controller 114 determines when an idle event has occurred, i.e., determines, based on the occurrence or non-occurrence of specified event(s), that there are likely to be no user interactions for a specified time (1 hour, etc.). An idle event therefore functions as an indication that a user is unlikely to interact with the electronic device 100 for the specified time—and thus will likely not expect electronic device 100 to be responsive during the specified time. For example, controller 114 can monitor for a low power state inactivity timer expiring, the low power state inactivity timer having been started upon detecting a most recent user interaction such as a key press, a mouse movement, a closure of a software program, etc. (Note that the "low power inactivity timer" is a different timer than the "inactivity timer" described above for FIG. 2.) As another example, controller 114 can monitor for a user presence timer expiring, the user presence timer having been started when a user could no longer be detected proximal to the electronic device such as by camera-based detection of a user, detection of a radio frequency identification (RFID) tag carried by a user, electromagnetic (e.g., LIDAR, radar, etc.) detection, sound- or motion-based detection, etc. As yet another example, controller 114 can monitor for a specified time of day or night occurring such as a user- or manufacturer-specified nighttime low power time (11 PM, etc.). As yet another example, controller 114 may detect an idle event based on a prediction that user interactions are unlikely to occur—such predictions are described below with respect to FIG. 5.

In some embodiments, controller 114 receives at least some idle event thresholds, values, specifications, etc. from an external source, such as a user, a system administrator, or a manufacturer. For example, controller 114 may receive, from a source external to electronic device 100, some or all of a low power state inactivity timer value, a user presence timer value, and the specified time. The timer values can be respective absolute amounts of time or offset times.

Along with monitoring for idle events, controller 114 monitors for system events (step 306). For this operation, controller 114, using various monitoring mechanisms (which may be different than the monitoring mechanisms for the idle events), keeps track of system parameters such as battery levels, system temperatures, idle/busy times, read/write rates, etc. and detects corresponding system events when such system events occur. For example, controller 114 may detect a system event based on a particular battery discharge level occurring, such as a battery that is more than N percent (e.g., 50%, 80%, etc.) discharged. As another example, controller 114 may detect a system event based on a specified trend in a battery discharge rate occurring, such as a battery that has discharged more than N percent in a specified time (e.g., 30%, 70%, etc. in the last 2 hours, 3 hours, etc.). As yet another example, controller 114 may detect a system event based on a threshold temperature occurring for one or more portions of the electronic device, such as a portion of processing subsystem 102 (e.g., a CPU core, GPU core, etc.) being above a specified overheat temperature. As yet another example, controller 114 may receive an indication of a request to make the transition from an external source, such as receiving an input from a user, a request via a network another electronic device, etc.

Upon detecting an idle event or a system event, controller 114 causes the one or more subsystems to transition from the first low power state to the second low power state (step 308). As described above, during this operation, controller 114 performs operations directed at configuring the subsystems to operate in the second low power state. For example, controller 114 may reduce a supply voltage for some or all of a given subsystem to a voltage associated with the second low power state, such as 0.2 V, 0 V, or another value. As another example, controller 114 may cause a hard disk drive to stop spinning and power down or cause a solid state drive to power down.

In some embodiments, subsystem operating state for a given subsystem (e.g., values in registers, memory elements, state flags, flops and/or latches, etc.), which is retained in the first low power state, is not retained when the subsystem is transitioned to the second low power state. In these embodiments, assuming that the subsystem is eventually to be restored to the operating state from before the transition to the second low power state, the subsystem state is to be retained. For example, the subsystem state may be copied to a non-volatile memory such as a mass-storage device and/or a volatile memory for which power is maintained such as a shadow copy in the subsystem itself or a volatile memory elsewhere in electronic device 100.

The one or more subsystems then operate in the second low power state until transitioned into another power state. By transitioning the one or more subsystems from the first power state to the second power state as described, these embodiments configure the one or more subsystems (and electronic device 100 generally) in a power state in which less power is consumed, heat is generated, noise is made, etc. when either it is realized that a user will likely not expect electronic device 100 to be responsive or when a system event occurs, which can help to improve the overall power efficiency of electronic device 100.

Transitioning from the Second Low Power State to the First Low Power State

Figure 4:
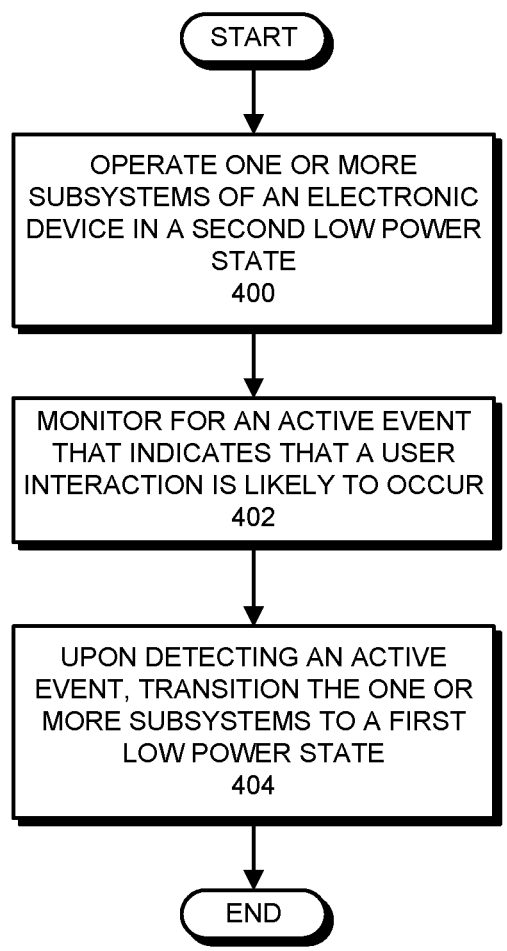
FIG. 4 presents a flowchart illustrating a process for transitioning one or more subsystems of an electronic device from the second low power state to the first low power state in accordance with some embodiments.

The described embodiments perform operations for transitioning one or more of the subsystems in electronic device 100 (e.g., processing subsystem 102, networking subsystem 106, etc.) from the second low power state to the first low power state. FIG. 4 presents a flowchart illustrating a process for transitioning the one or more subsystems from the second low power state to the first low power state in accordance with some embodiments. Note that the operations shown in FIG. 4 are presented as a general example of functions performed by some embodiments. The operations performed by other embodiments include different operations and/or operations that are performed in a different order. Additionally, although certain mechanisms are used in describing the process (e.g., controller 114, etc.), in some embodiments, other mechanisms can perform the operations.

The process shown in FIG. 4 starts when one or more subsystems of electronic device 100 operate in a second low power state (step 400). As described above, in the second low power state, some or all of the one or more subsystems are unable to perform at least some typical operations (or are unable to perform the typical operations at ordinary speeds) and must transition to the active state before the at least some of the typical operations can be performed. For example, the display subsystem, memory subsystem, and processing subsystem may be disabled or powered down. In some embodiments, in the second low power state, subsystem state is not retained in some or all functional blocks in the one or more subsystems and/or functional blocks and circuits in the subsystems are disabled, so that the functional blocks or circuits should be re-enabled or powered up to transition to the active state. The one or more subsystems may have been configured in the second low power state using the operations shown in FIG. 3 or in another way.

Controller 114 then monitors for an active event that indicates that a user interaction is likely to occur (step 402). For this operation, controller 114, using various monitoring mechanisms, keeps track of events and other indicators of possible upcoming user interactions. Based on the monitoring, controller 114 determines when an active event has occurred, i.e., determines, based on the occurrence or non-occurrence of specified event(s), that there are likely to be user interactions within a specified time (10 minutes, etc.). An active event therefore functions as an indication that a user is likely to interact with the electronic device 100 within the specified time—and thus will likely expect electronic device 100 to be responsive during the specified time. For example, controller 114 can monitor for a user presence such as when a user can be detected proximal to the electronic device using camera-based detection of a user, detection of a radio frequency identification (RFID) tag carried by a user, electromagnetic (e.g., LIDAR, radar, etc.) detection, sound- or motion-based detection, etc. As another example, controller 114 can monitor for a specified time of day or night occurring such as a user- or manufacturer-specified workday power time (9 AM, etc.). As yet another example, controller 114 may detect an active event based on a prediction that user interactions are likely to occur—such predictions are described below with respect to FIG. 5. Note that, in some embodiments, an active event may function as a real event—in case a prediction of an upcoming user interaction has not happened or has been disabled.

Upon detecting an active event, controller 114 causes the one or more subsystems to transition from the second low power state to the first low power state (step 404). As described above, during this operation, controller 114 performs operations directed at configuring the subsystems to operate in the first low power state. For example, controller 114 may increase a supply voltage for some or all of a given subsystem to a voltage associated with the second low power state, such as 1.2 V, 1.5 V, or another value. As another example, controller 114 may cause a hard disk drive to power up (although maybe not spin) or cause a solid state drive to power up.

In the embodiments where subsystem operating state for a given subsystem is not retained when the subsystem is transitioned to the second low power state, retained operating state is copied from the location where the operating state is retained to the corresponding subsystem. For example, using the preserved operating state, registers can be set to values that were present before the transition to the second low power state, subsystem flags can be set to corresponding pre-transition values, etc. In the embodiments where one or more functional blocks or circuits in some or all of the one or more subsystems are to be restarted or reinitialized to complete the transition to the first low power state, these functional blocks or circuits can be restarted or reinitialized. In these embodiments, a startup or initialization operation or sequence of operations may be performed to restart or reinitialize the functional blocks or circuits.

The one or more subsystems then operate in the first low power state until transitioned into another power state. By transitioning the one or more subsystems from the second power state to the first power state as described, these embodiments configure the one or more subsystems (and electronic device 100 generally) in a power state in which more power is consumed, heat is generated, noise is made, etc., but less electrical power is consumed, heat is generated, etc, than would be if electronic device 100 were to be transitioned to the active state. In addition, the one or more subsystems are rendered more ready to transition to the active state, i.e., are configured so that the transition to the active state, if one should occur based on user interaction, occurs more rapidly—thereby making electronic device 100 appear more responsive to a user.

Predictions of User Interactions

Figure 5:
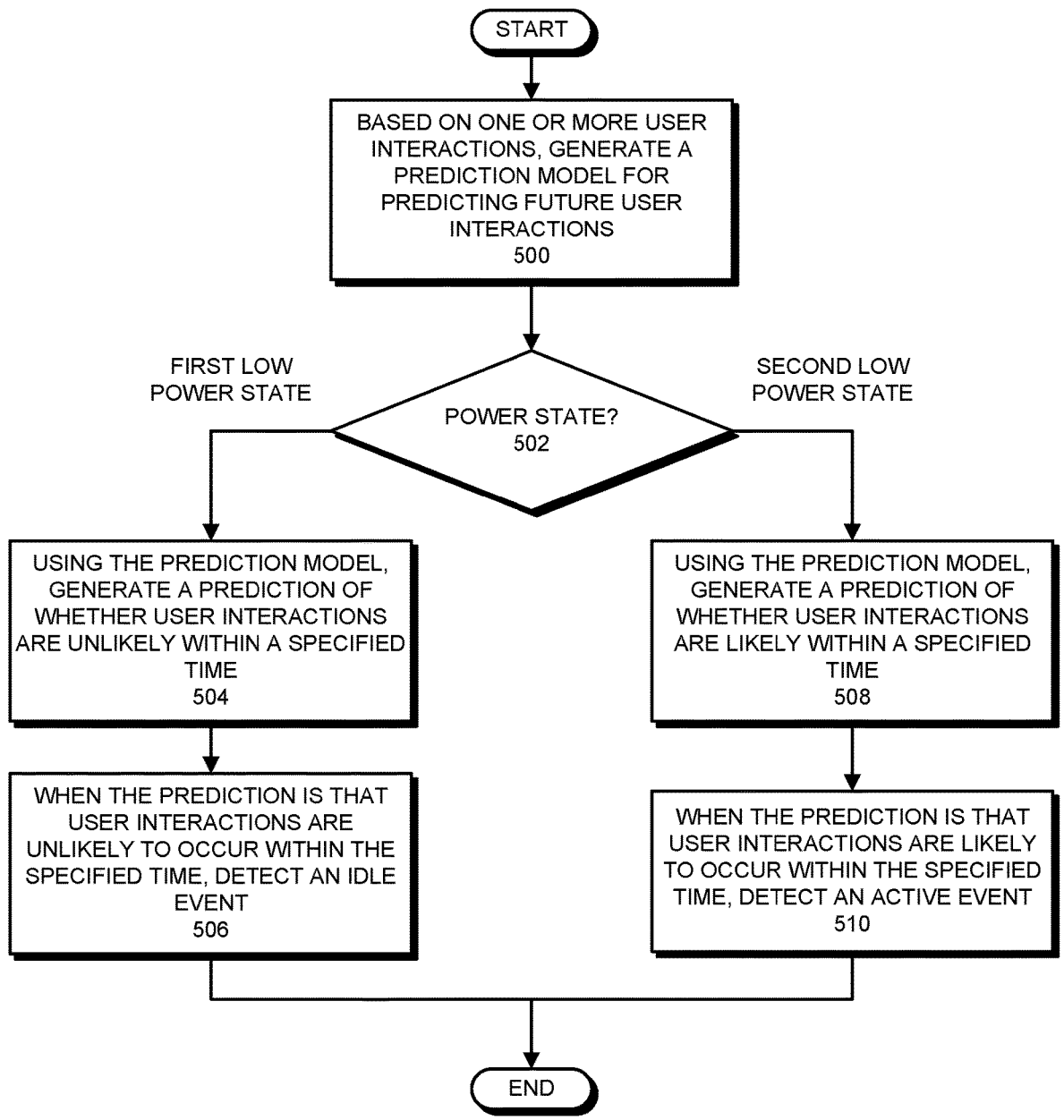
FIG. 5 presents a flowchart illustrating a process for using a prediction to detect idle events and active events in accordance with some embodiments.

As described above, in some embodiments, controller 114 causes transitions between the first low power state and the second low power state based on predictions of whether user interaction is likely to, or is not likely to, occur within a specified time. FIG. 5 presents a flowchart illustrating a process for using a prediction to detect idle events and active events in accordance with some embodiments. Note that the operations shown in FIG. 5 are presented as a general example of functions performed by some embodiments. The operations performed by other embodiments include different operations and/or operations that are performed in a different order. Additionally, although certain mechanisms are used in describing the process (e.g., controller 114, etc.), in some embodiments, other mechanisms can perform the operations.

The process shown in FIG. 5 starts when, based on one or more user interactions, controller 114 (or another entity, such as processing subsystem 102) generates a prediction model for predicting future user interactions (step 500). For example, controller 114 can monitor startup times or use times (e.g., times when a user is interacting with electronic device 100 such as by key presses, mouse movements, voice commands, etc.) for electronic device 100 and can generate a prediction model that predicts future times at which electronic device 100 is likely to be started up or used. As another example, controller 114 can monitor environmental values such as physical location (via global position system sampling, local Wi-Fi or cellular network-based detection, etc.), motion profiles, ambient sound and/or light profiles that occur before electronic device 100 is left idle (i.e., not interacted with by a user for at least a given amount of time, such as 2 hours, 6 hours, etc.) and can generate a prediction model that predicts future times at which electronic device is likely to be idle. The prediction model can include a lookup table, a curve, a mathematical model, a logical model, a neural network, and/or another type of model that returns indications of likelihood or not of user interactions within a specified time based on corresponding input values (such as those described above). As another example, controller 114 can monitor user activity profiles, such as software opened/closed and tasks being performed before electronic device 100 is left idle and can generate a prediction model that predicts future times at which electronic device 100 is likely to be idle.

In some embodiments, the prediction model is wholly generated by controller 114 based on user interactions and other local values or parameters (such as environmental values) and one or more rules, guides, algorithms, etc. In some embodiments, however, the prediction model is at least partially received from another source, such as a manufacturer of electronic device 100, a software entity (operating system, etc.), and/or a user.

Controller 114 then, when one or more subsystems are in the first low power state (step 502), uses the prediction model to generate a prediction of whether user interactions are unlikely within a specified time (step 504). In other words, the prediction model is used to determine a prediction of whether electronic device 100 is unlikely to be used by a user, and thus is not expected to be responsive, within the specified time. Depending on the particular implementation of the prediction model, this operation includes controller 114 collecting information about user interactions and/or other input values and using the information to look up, calculate, and/or generate the prediction. For example, assuming that the prediction model is a lookup table that has a listing of times (e.g., 15 minute time intervals) and a corresponding prediction of whether user interaction is likely to occur in each interval, controller 114 can use a present time to look up the prediction in the lookup table. As another example, assuming that the prediction model is a mathematical model such as a neural network that relates user activity values (e.g., recent key presses, mouse movements, software opened/closed, etc.) to predictions of whether user interaction is likely to occur within a given time, controller 114 can acquire the user activity values and compute a prediction.

When the prediction from step 504 is that user interactions are unlikely to occur with the specified time, controller 114 detects an idle event (step 506). As described above with respect to FIG. 3, upon detecting an idle event in the first low power state, controller 114 causes the one or more subsystems to transition from the first low power state to the second low power state.

Alternatively, when one or more subsystems are in the second low power state (step 502), controller 114 uses the prediction model to generate a prediction of whether user interactions are likely within a specified time (step 508). In other words, the prediction model is used to determine a prediction of whether electronic device 100 is likely to be used by a user, and thus is expected to be responsive, within the specified time. Depending on the particular implementation of the prediction model, this operation includes controller 114 collecting information about user interactions and/or other input values and using the information to look up, calculate, and/or generate the prediction, similar to what is described for step 504—although for an opposite prediction.

When the prediction from step 508 is that user interactions are likely to occur with the specified time, controller 114 detects an active event (step 510). As described above with respect to FIG. 4, upon detecting an active event in the second low power state, controller 114 causes the one or more subsystems to transition from the second low power state to the first low power state.

Figure 6:
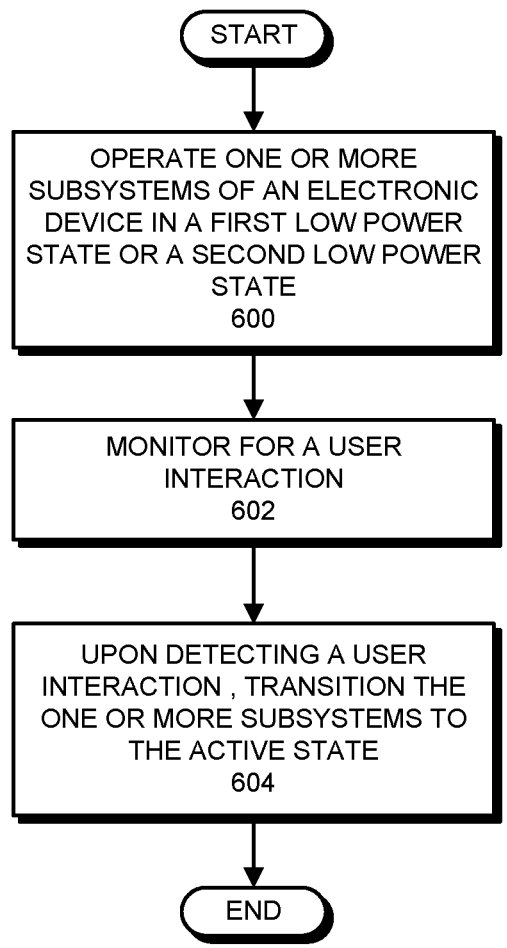
FIG. 6 presents a flowchart illustrating a process for transitioning one or more subsystems of an electronic device from the first low power state or the second low power state to the active state in accordance with some embodiments.

Transitioning from the First Low Power State or the Second Low Power State to the Active State The described embodiments perform operations for transitioning one or more of the subsystems (e.g., processing subsystem 102, networking subsystem 106, etc.) in electronic device 100 from the first low power state or the second low power state to the active state. FIG. 6 presents a flowchart illustrating a process for transitioning the one or more subsystems from the first low power state or the second low power state to the active state in accordance with some embodiments. Note that the operations shown in FIG. 6 are presented as a general example of functions performed by some embodiments. The operations performed by other embodiments include different operations and/or operations that are performed in a different order. Additionally, although certain mechanisms are used in describing the process (e.g., controller 114, etc.), in some embodiments, other mechanisms can perform the operations.

The process shown in FIG. 6 starts when one or more subsystems of electronic device 100 operate in a first low power state or a second low power state (step 600). As described above, in the first low power state and the second low power state, some or all of the one or more subsystems are unable to perform at least some typical operations (or are unable to perform the typical operations at ordinary speeds) and must transition to the active state before the at least some of the typical operations can be performed. The one or more subsystems may have been configured in the first low power state or the second low power state using the operations shown in FIGS. 3-4 or in another way.

Controller 114 then monitors for a user interaction (step 602). For this operation, controller 114, using various monitoring mechanisms, observes corresponding elements of electronic device 100 to detect user interactions. For example, controller 114 may monitor for key presses, mouse movements, physical movements of electronic device 100 (when electronic device 100 is a portable device such as a smart phone or a tablet computer and is picked up or carried by a user), sounds, touches on a touch screen or a chassis of electronic device 100, etc.

Upon detecting a user interaction, controller 114 causes the one or more subsystems to transition from the second low power state or the first low power state to the active state (step 604). As described above, during this operation, controller 114 performs operations directed at configuring the subsystems to operate in the active state, so that electronic device 100 outwardly appears to be powered on and operating normally, with the one or more subsystems responding typically to user interactions such as inputs on a keyboard or mouse, etc. Note that the transition from the first low power state is faster than the transition from the second low power state, but regardless of which of the low power states is being used, a user interaction will cause controller 114 to transition the one or more subsystems from the respective low power state to the active state.

Transition Chart

As shown in FIGS. 2-6, the described embodiments perform operations for transitioning subsystems between the active state, the first low power state, and the second low power state. FIG. 7 presents a chart illustrating the transitions between power states in accordance with some embodiments. Note that the transitions between power states shown in FIG. 7 are presented as a general example of transitions performed by some embodiments. The transitions performed by other embodiments include different transitions and/or transitions that are performed in a different order. For example, the transitions may occur at various different times, so the scale of time in FIG. 7 is not the only scale of time. As another example, that particular pattern of transitions through the power states is not the only possible pattern; other patterns could be used. Additionally, although certain mechanisms are used in describing the process (e.g., controller 114, etc.), in some embodiments, other mechanisms can perform the operations.

As can be seen in FIG. 7, one or more subsystems of electronic device 100 (e.g., processing subsystem 102, networking subsystem 106, etc.) initially operate in the active state. This is shown by the portion of the chart prior to transition 700.

At the expiration of an inactivity timer, controller 114 causes the one or more subsystems to make transition 700, which configures the subsystems in the first low power state. By making transition 700, controller 114 puts the one or more subsystems in a "shallower" or "higher power" low power state (relative to the second low power state), which enables the conservation of power, etc., but also leaves the one or more subsystems in a power state from which resuming the active state is relatively rapid (again, relative to the second low power state).

The one or more subsystems next operate in the first low power state until an idle event and/or a system event occurs, at which point controller 114 causes the one or more subsystems to make transition 702, which configures the one or more subsystems in the second low power state. By making transition 702, controller 114 puts the one or more subsystems in a "deeper" or "lower power" low power state (relative to the first low power state), which enables improved conservation of power, etc., but leaves the one or more subsystems in a power state from which resuming the active state is relatively slow (again, relative to the first low power state).

The one or more subsystems then operate in the second low power state until an active event occurs, at which point controller 114 causes the one or more subsystems to make transition 704, which returns the one or more subsystems in the first low power state. By making transition 704, controller 114 returns the one or more subsystems to the "shallower" or "higher power" low power state, which enables the conservation of power, etc., but also leaves the one or more subsystems in a power state from which resuming the active state is relatively rapid due to the possibility of upcoming user interaction—as indicated by the active event.

The one or more subsystems next operate in the first low power state until a user interaction is detected, at which point controller 114 causes the one or more subsystems to make transition 706, which returns the one or more subsystems to the active state. By making transition 706, controller 114 enables the subsystems to perform typical operations and to respond to user interactions as expected. Note that earlier (i.e., in transition 704) configuring the one or more subsystems in the first low power state made transition 706 occur more rapidly than would have been possible from the second low power state, i.e., if transition 704 had not been made. This helps to make electronic device 100 appear more responsive.

In some embodiments, a computing device (e.g., electronic device 100, and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations. A computer-readable storage medium can be any device, medium, or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), system management units, power controllers, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., processing subsystem 102, controller 114, and/or some portion thereof) is stored on a non-transitory computer-readable storage medium that includes a database or other data structure which can be read by a computing device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuit elements (and possibly large numbers of circuit elements) that perform the described operations. For example, the circuit elements may include integrated circuits, discrete circuit elements, etc. In some embodiments, the circuits in a functional block include circuits that execute program code (e.g., microcode, firmware, applications, etc.) to perform the described operations. For example, a functional block may include one or more processing pipelines, compute units, dedicated processing circuits, etc.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a hardware controller; and
one or more hardware subsystems, wherein the one or more hardware subsystems support an active state, a first low power state, and a second low power state, wherein the first low power state and the second low power state are separate low power states, wherein the first low power state is configured for a more rapid resumption of the active state than the second low power state;
wherein the hardware controller is configured to:
acquire a prediction model, the prediction model having been generated based at least in part on a plurality of previous user interactions and corresponding values for one or more properties of an environment of the electronic device, the prediction model configured to return, based on present values of the one or more properties, predictions of whether a user interaction is likely to occur within a specified time;
determine using the prediction model, based on present values for the one or more properties, a prediction of whether a user interaction is likely to occur within the specified time; and
cause the one or more hardware subsystems to:
transition from the first low power state to the second low power state upon detecting an idle event that indicates that a user interaction is not likely to occur, wherein the idle event comprises a prediction that a user interaction is not likely to occur within the specified time; and
transition from the second low power state to the first low power state upon detecting an active event that indicates that a user interaction is likely to occur, wherein the active event comprises a prediction is that a user interaction is likely to occur within the specified time.

2. The electronic device of claim 1, wherein the idle event comprises one or more of:
a low power state inactivity timer expiring, the low power state inactivity timer having been started upon detecting a most recent user interaction;
a user presence timer expiring, the user presence timer having been started when a user could no longer be detected proximal to the electronic device; and
a specified time of day or night occurring.

3. The electronic device of claim 2, wherein the hardware controller is further configured to:
receive, from a source external to the electronic device, some or all of a low power state inactivity timer value, a user presence timer value, and the specified time.

4. The electronic device of claim 1, wherein the active event comprises one or more of:
a specified time of day or night occurring; and
a detection of a user proximal to the electronic device.

5. The electronic device of claim 4, wherein the hardware controller is further configured to:
receive, from a source external to the electronic device, the specified time.

6. The electronic device of claim 1, wherein the hardware controller is further configured to cause the one or more hardware subsystems to:
transition from the first low power state to the second low power state upon detecting a system event, the system event comprising one or more of:
a particular battery discharge level occurring;
a specified trend in a battery discharge rate occurring;
a threshold temperature occurring for one or more portions of the electronic device; and
a receipt of a request for transitioning from an external source.

7. The electronic device of claim 1, wherein the hardware controller is further configured to cause the one or more hardware subsystems to:
remain in the first low power state and not transition to the second low power state when operating in a given operating mode, the given operating mode comprising a wake on voice state or an audio playback state.

8. The electronic device of claim 1, wherein the hardware controller is further configured to cause the one or more hardware subsystems to:
transition from the active state to the first low power state upon an expiration of an inactivity timer that was started upon detecting a last user interaction in the active state.

9. The electronic device of claim 1, wherein the hardware controller is further configured to cause the one or more hardware subsystems to:
transition from the first low power state or the second low power state to the active state upon detecting a user interaction.

10. The electronic device of claim 1, wherein the hardware controller is further configured to generate the prediction model.

11. The electronic device of claim 1, wherein the one or more properties of the environment of the electronic device comprise one or more of:
a physical location of the electronic device;
a motion profile of the electronic device;
an ambient sound profile of the electronic device; and
an ambient light profile of the electronic device.

12. A method for controlling a power state of an electronic device that comprises a hardware controller and one or more hardware subsystems, the one or more hardware subsystems supporting an active state, a first low power state, and a second low power state, the first low power state and the second low power state being separate low power states, and the first low power state being configured for a more rapid resumption of the active state than the second low power state, the method comprising:
acquiring, by the hardware controller, a prediction model, the prediction model having been generated based at least in part on a plurality of previous user interactions and corresponding values for one or more properties of an environment of the electronic device, the prediction model configured to return, based on present values of the one or more properties, predictions of whether a user interaction is likely to occur within a specified time;
determining, by the hardware controller, using the prediction model, based on present values for the one or more properties, a prediction of whether a user interaction is likely to occur within the specified time; and
causing, by the hardware controller, the one or more hardware subsystems to:
transition from the first low power state to the second low power state upon detecting an idle event that indicates that a user interaction is not likely to occur, wherein the idle event comprises a prediction that a user interaction is not likely to occur within the specified time; and
transition from the second low power state to the first low power state upon detecting an active event that indicates that a user interaction is likely to occur, wherein the active event comprises a prediction is that a user interaction is likely to occur within the specified time.

13. The method of claim 12, wherein the idle event comprises one or more of:

a low power state inactivity timer expiring, the low power state inactivity timer having been started upon detecting a most recent user interaction;
a user presence timer expiring, the user presence timer having been started when a user could no longer be detected proximal to the electronic device; and
a specified time of day or night occurring.

14. The method of claim 13, further comprising:
receiving, by the hardware controller, from a source external to the electronic device, some or all of a low power state inactivity timer value, a user presence timer value, and the specified time.

15. The method of claim 12, wherein the active event comprises one or more of:
a specified time of day or night occurring; and
a detection of a user proximal to the electronic device.

16. The method of claim 15, further comprising:
receiving, by the hardware controller, from a source external to the electronic device, the specified time.

17. The method of claim 12, further comprising:
causing, by the hardware controller, the one or more hardware subsystems to:
transition from the first low power state to the second low power state upon detecting a system event, the system event comprising one or more of:
a particular battery discharge level occurring;
a specified trend in a battery discharge rate occurring;
a threshold temperature occurring for one or more portions of the electronic device; and
a receipt of a request for transitioning from an external source.

18. The method of claim 12, further comprising:
causing, by the hardware controller, the one or more hardware subsystems to:
remain in the first low power state and not transition to the second low power state when operating in a given operating mode, the given operating mode comprising a wake on voice state or an audio playback state.

19. The method of claim 12, further comprising:
causing, by the hardware controller, the one or more hardware subsystems to:
transition from the active state to the first low power state upon an expiration of an inactivity timer that was started upon detecting a last user interaction in the active state.

20. The method of claim 12, further comprising:
causing, by the hardware controller, the one or more hardware subsystems to:
transition from the first low power state or the second low power state to the active state upon detecting a user interaction.

21. The method of claim 12, further comprising:
generating, by the hardware controller, the prediction model.

22. The method of claim 12, wherein the one or more properties of the environment of the electronic device comprise one or more of:
a physical location of the electronic device;
a motion profile of the electronic device;
an ambient sound profile of the electronic device; and
an ambient light profile of the electronic device.

* * * * *